J. B. WALLACE.
ATTACHMENT FOR PLOWS.
APPLICATION FILED MAY 20, 1920.
1,418,410.
Patented June 6, 1922.
2 SHEETS—SHEET 1.
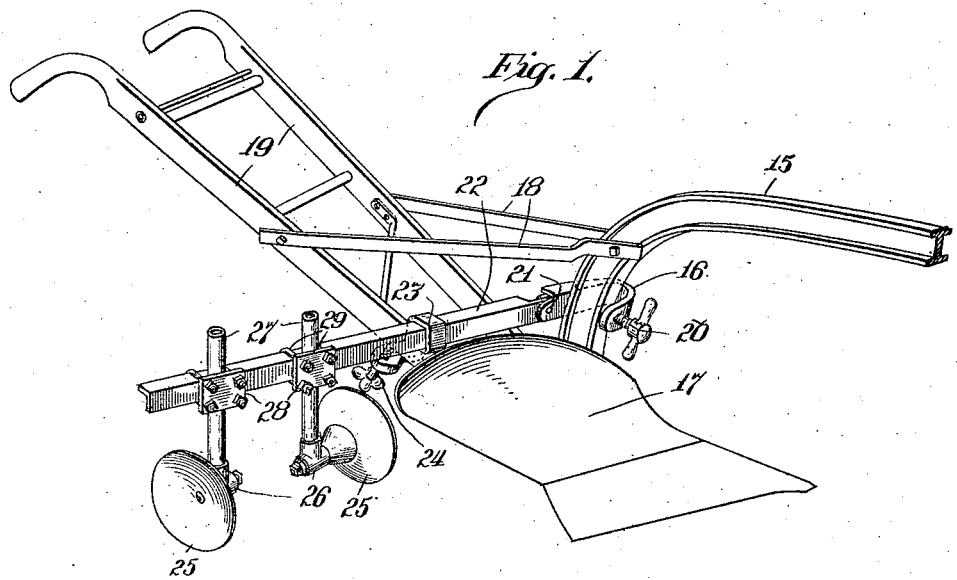
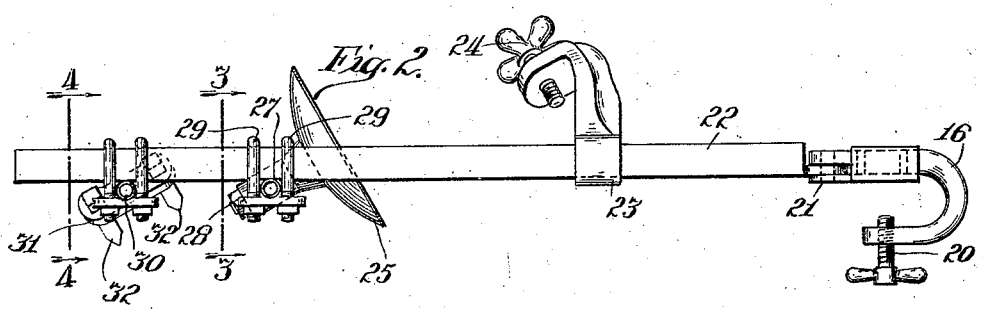
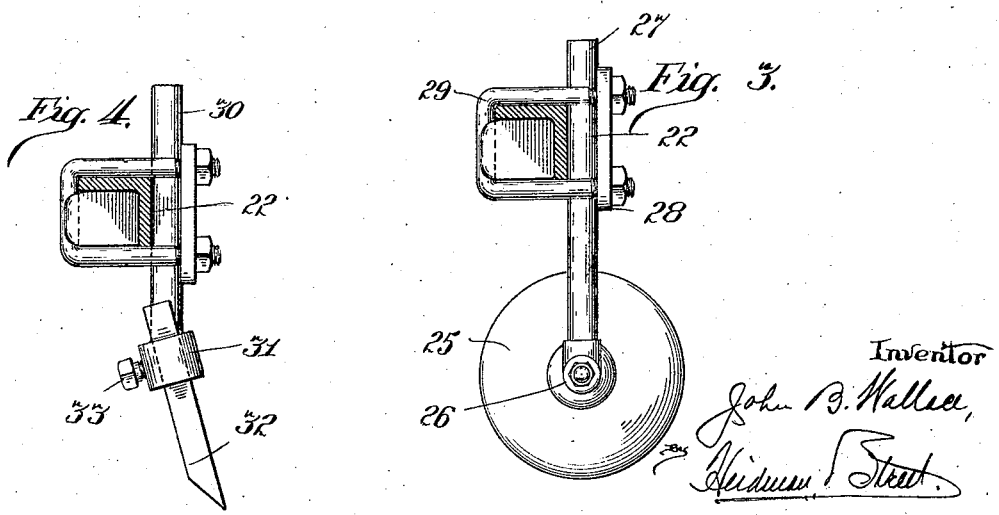

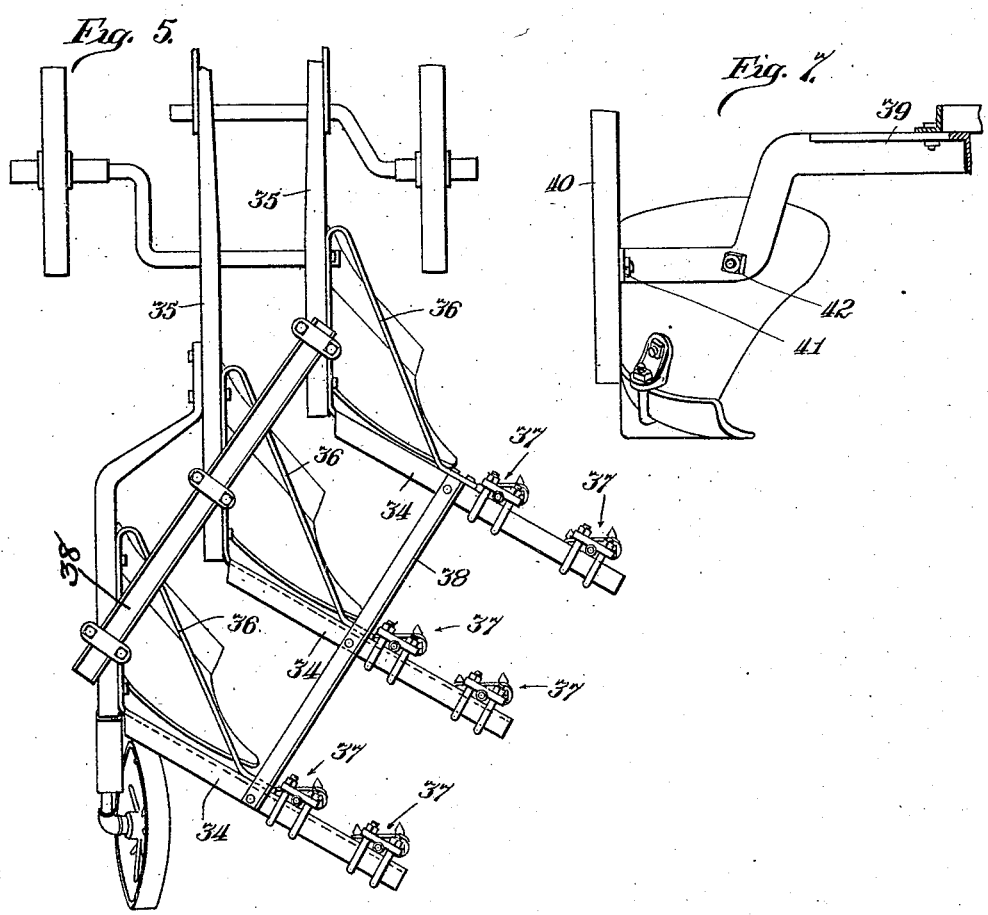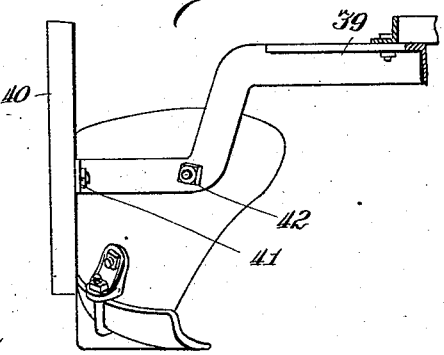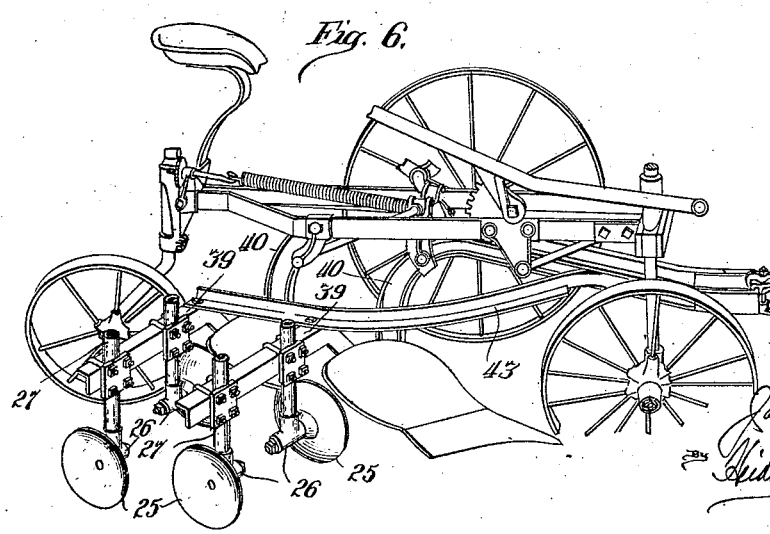

UNITED STATES PATENT OFFICE.

JOHN B. WALLACE, OF MUKWONAGO, WISCONSIN.

ATTACHMENT FOR PLOWS.

1,418,410.  Specification of Letters Patent.  Patented June 6, 1922.

Application filed May 20, 1920. Serial No. 382,702.

*To all whom it may concern:*

Be it known that I, JOHN B. WALLACE, a citizen of the United States, and a resident of Mukwonago, in the county of Waukesha and State of Wisconsin, have invented certain new and useful Improvements in Attachments for Plows, of which the following is a description, reference being had to the accompanying drawings, which form a part of my specification.

My invention relates to an attachment for plows adapted for breaking or pulverizing and leveling or to harrow the soil as the furrows are turned up; the attachment being so arranged that its action on the soil will take place while the soil is soft and before it has a chance to settle into its new position.

The object of the invention is to provide an attachment of the type referred to adapted to be readily secured to a walking plow, tractor plow or a sulky or riding type of plow and which will permit of adjustments suited to different types or textures of soil and therefore also to different widths and types of furrow-slices, as well as adjustment as to depth.

A further object of the invention is to provide a construction which will permit of the use of harrow-teeth, especially adapted for use in friable or light soils; or the use of discs where the plow is used in heavy soils; the purpose of the attachment being to thoroughly break up and level off the thrown-up soil or furrow-slice in a much more uniform manner than can be accomplished by the use of separate and subsequently operated harrows; while at the same time performing the breaking up or harrow operation at a time when the turned-up soil or furrow-slice is in better condition for such operation; the attachment, which is evident from the foregoing description and the drawings, obviating the necessity for a subsequent discing or harrowing of the soil.

Another object of my invention is to provide an attachment which may be readily applied to old plows in use, or which may be permanently secured to plows while same are being constructed; and wherein the attachment, when intended for a walking plow, will have a yielding point to permit the plow to be readily removed from the soil, when turning at the ends of the furrows, which is usually accomplished by throwing or inclining the plow toward the cutting side or furrow-slice.

The objects and advantages of my invention will be readily comprehended from the following detailed description of the accompanying drawings, wherein:—

Figure 1 is a perspective view of a walking plow provided with my attachment removably secured thereto.

Figure 2 is a plan view of the attachment removed from the plow.

Figure 3 is a detail view taken on the line 3—3 of Figure 2.

Figure 4 is a detail view taken on the line 4—4 of Figure 2.

Figure 5 is a top plan view of a tractor type of plow provided with my attachment.

Figure 6 is a perspective view of a sulky plow provided with my attachment.

Figure 7 is a detail view in elevation illustrating one form of securing my attachment to the sulky type of plow illustrated in Figure 6.

As my invention does not relate to the plow per se, a detailed description of the different types of plows illustrated need not be entered into. The attachment, as illustrated in Figure 1, is of the type adapted to be secured to an old plow, wherein the attachment is removably secured to the plow-beam 15 by means of a suitable clamp shown somewhat in the nature of a yoke or hook member 16 adapted to extend about the plow-beam preferably at a point intermediate of the point where the mold-board 17 of the plow is secured to the beam 15 and the brace-members 18 for the handles 19 are secured. The member 16, in the specific exemplification of the invention, is secured in place by means of a suitable clamp-screw 20 adapted to form clamping engagement with the beam 15 of the plow. The other end of the clamp member 16, disposed toward the rear of the plow-beam, has pivotal connection at 21 with a beam 22, of any suitable construction, being shown in the nature of an angle iron in Figure 1 and of length sufficient to extend diagonally rearward of the mold-board and therefore transversely of the furrow-slice, a distance sufficient to permit of harrow attachments arranged in such manner as to permit them to extend substantially parallel with the cutting face of the plow-share and lengthwise of the furrow-slice. In order to maintain the beam 22 with its harrow attachments down in operative position, especially where the attachment is secured to a walking type of plow, the beam 22 is shown provided with a suitable clamp 23 in the nature of a hook or sleeve portion adapted to fit over or about the beam 22, intermediate of the handles 19 of the plow; the clamp 23 being provided with a downwardly and laterally extending lug or extension having a suitable clamp-screw 24 which is adapted to form clamping engagement with one of the handles 19 of the plow. This will maintain the beam 22 and its attachments in proper operative position.

In the particular exemplification of the invention as shown in Figure 1, the beam 22 of my attachment is provided with a pair of discs 25 having trunnions suitably mounted or secured to the convexed sides of the discs and rotatably mounted in a sleeve portion 26 at the lower ends of the short posts or members 27. The posts 27 are preferably made tubular, and are shown preferably clamped against the forward, flat side of the angle iron or beam 22 by means of any suitable clamping mechanism, as for example a plate 28 through which the threaded ends of two U-bolts 29 extend; the latter and the plate 28 being drawn in firm clamping engagement with the beam 22 and with the posts 27, respectively, by means of nuts, as shown in Figure 1. By making the posts 27 tubular as shown, it is apparent that the harrow attachment may be adjusted laterally through the arc of a circle concentric with the longitudinal axis of the post, when the clamp-bolts are released, thus permitting the discs to be arranged at the desired angularity to the line of draught and therefore to the cutting face of the plow to adapt the discs to different types or conditions of soil.

It is also apparent from the construction shown that the disc or discs may be adjusted lengthwise of the beam 22 to be disposed at the desired point relative to the furrow-slice; said adjustment being accomplished by loosening the nuts on the bolts 29 to release the clamping plate 28; at the same time the harrow elements may be adjusted vertically to bring them at the desired depth relative to the furrow-slice. Where the attachment is to be secured to new plows, it is evident that the attaching or clamp member 16 may be permanently or integrally secured to the plow-beam and any suitable pivotal connection provided between it and the harrow element-holding beam 22, so as to have the beam extend preferably diagonally rearward of the mold-board as disclosed in Figure 1.

Where the plow is employed in friable or light soils, the harrow teeth construction, shown in Figure 4, may be employed instead of the discs; the harrow tooth construction comprising an attaching post or shank 30, also preferably made cylindrical or tubular and terminating at the bottom in one or more right angularly disposed portions 31 apertured for the passage of a tooth 32. The tooth or teeth 32 may be secured in place in any suitable manner, as for example by a clamp-bolt 33. In the drawings, I have illustrated a double toothed construction; the teeth 32 being arranged in spaced relation and secured in the apertures of the angularly disposed arms arranged to opposite sides of the longitudinal center line of the post 30. The tooth construction, like the disc construction, is intended to be adjustably secured to the beam 22 by means of the clamping element comprising the plate 28 and suitable U-bolts 29; the respective elements being drawn into firm clamping engagement with one another by means of nuts secured to the ends of the bolts.

With the pivotal point arranged in the member or beam 22, it is apparent that the plow may be thrown or inclined toward the side on which the harrow attachment is secured, namely toward the cutting side of the plow, when it is desired to release the plow-point, as the pivotal connection 21 will permit the harrow attachment to move vertically relative to the mold-board.

In Figure 5, I disclose my invention secured to a tractor-plow, wherein the beams 34 of my attachment are preferably made of angle iron, having their inner ends bent at an oblique angle and partially cut away so as to provide a flat portion adapted to be secured against the sides of the plow-beams 35; the beams 34 being riveted or bolted to the beams 35. In order to provide sufficient rigidity to the harrow-beams 34, I have shown the inner ends of the beams bent backward into brace-like form, as indicated at 36, with the ends of the brace portions 36 riveted to the side of the beams 34. The beams 34, as clearly shown in Figure 5, will be disposed at an obtuse angle to the plow-beams 35 and arranged rearward of the mold-boards of the respective plow-shares, with the harrow element indicated at 37 arranged at suitable points on the respective beams 34 relative to the cutting surfaces of the plows, so that the respective harrow elements will therefore be disposed at proper points relative to the furrow-slices thrown up by the respective mold-boards of the plows.

In order to prevent any possible vibration of the beams or supporting members 34, additional brace 38 may be employed secured at a suitable point to the supporting means or members 34 and to the plow beams 35 and extending transversely of said supporting means and the plow beams whereby the harrow elements, whether of the tooth or disc form, arranged adjacent the outer ends of the respective supporting members or beams, will be maintained in proper operative position so as to function on the furrow-slice or slices thrown upward or over by the mold-boards of the respective plow-shares.

In Figure 6, I illustrate my invention applied to a sulky or riding-type of plow, wherein the supporting means or beams 39, which for illustration are also shown in the nature of angle irons, have their inner ends disposed downwardly adjacent the rear sides of the mold-boards of the plows and then bent substantially parallel with the main portion thereof along the rear side of the mold-board, as more clearly shown in Figure 7, while the immediate ends of the supporting members or beams may be given an angular bend to permit their riveting or bolting to the plow-beams 40, as shown at 41 in Figure 7, where the beams or supporting members 39 also constitute braces for the mold-boards and are secured thereto as indicated at 42 in Figure 7. In plows of this type, the mold-boards are usually provided with a brace secured at one end to the rear of the mold-board while the other end is secured to the plow-beam. With my attachment, the supporting members or beams 39 not only act as supporting members for the harrow elements, but the supporting members or beams also constitute braces for the mold-boards as described. In Figure 6 I illustrate the harrow elements in the nature of discs 25 having trunnions rotatably mounted as previously described in the sleeve or hub-portions at the lower ends of the posts or shanks 27 which are preferably made cylindrical or tubular in form so as to permit adjustment of the harrow elements by rotation of the posts or shanks about their axes when the clamping elements have been sufficiently released to permit such rotation; the harrow elements, like in the previously described construction, being also adjustable lengthwise of the supporting members or beams 39 as well as vertically so as to position the harrow elements at proper depth relative to the furrow-slices. In order to prevent any possible vibration on the part of the supporting members or beams 39 in the construction shown in Figure 6, an additional brace bar 43 may be employed secured to the various supporting beams 39 and at a forward point to the plow-beams as shown in Figure 6.

I have shown and described the supporting member or beam 22 in the walking type of plow provided with a pivot point at 21 which will permit vertical movement of the harrow attachment, but it is apparent that the pivot connection may be in the nature of a universal joint which would adapt the supporting member or beam to not only move upwardly in a vertical direction, but also permit it to be swung upward and onto the handles of the plow when desired. It will be understood, of course, that in order to permit such movement of the harrow attachment it is necessary to previously release the clamp-screw 24 whereby the supporting member or beam is held down in operative operation; in other words, when it is desired to incline the plow toward the cutting side of the plow-share, it becomes necessary to release the clamp-screw 24 in order that the supporting beam may move relative to the plow as previously described.

I have described the supporting members or beams as preferably being disposed at an angle rearward of the mold-boards and substantially parallel with the cutting face of the plow-shares, but such disposition of the supporting members or beams may be somewhat altered, it being essential merely to have the harrow elements arranged at a suitable point relative to the mold-board so as not to have the furrow-slices thrown thereon while at the same time having the harrow elements arranged sufficiently close and rearward of the mold-boards where they will be caused to travel at the desired point or points lengthwise of the furrow-slice or slices as the case may be.

I have shown and described what I believe to be the simplest embodiments of my invention, but modifications may be made in certain details of construction without, however, departing from the spirit of the invention.

What I claim is:—

1. A plow attachment of the class described, comprising a supporting frame adapted to be secured to the plow-frame so as to extend across the furrow-slice, means whereby said frame is secured to the plow-frame against movement, harrow elements secured at predetermined points to said frame so as to be drawn through the furrow-slice lengthwise at such points, and means whereby the elements are adjustably secured to said frame and held against movement and maintained in a fixed plane relative to the plow-share whereby said elements are caused to enter the furrow-slice to a depth commensurate with the depth of the cut of the plow-share.

2. An attachment of the character described, comprising a supporting member or beam adapted to be secured to the plow-beam so as to be disposed rearward of the mould-board diagonally across the furrow-slice and substantially parallel with the cutting face of the plow-share, means whereby said member or beam is secured to one of the plow handles against movement independent of the plow, means whereby said member is removably secured to the plow-beam, said last means being provided with a pivot adjacent to the plow-beam to permit vertical movement of the supporting member relative to the plow-beam when the first mentioned means are released, and harrow elements secured on said member or beam so as to travel lengthwise of the furrow-slice, the relation between the harrow elements and said member or beam and b tween said member or beam and the plow-beam being such that the harrow-elements are maintained in a fixed plane relative to the plow-share, so that the working pressure against the face of the plow will maintain said elements in the furrow-slice to a depth commensurate with the depth of cut of the plow-share.

3. A plow attachment of the character described, comprising a supporting member or beam secured to the plow-frame so as to be disposed rearward of the mould-board of the plow diagonally of the furrow-slice, means whereby said member is held against movement independent of the plow, harrow elements each provided with a post, and means adapted to have clamping engagement with the posts and said member or beam whereby the elements may be vertically and laterally adjusted on the supporting member or beam so as to have the elements extend into the furrow-slice to the desired depth and at the desired point relative to the furrow-slice, the supporting member or beam and said elements being rigidly secured in place so that the depth of penetration of the furrow-slice by said elements will be fixed relative to the depth of cut by the plow and the pressure against the face of the plow prevent tilting thereof.

JOHN B. WALLACE.

Witnesses:
F. A. FLORELL,
G. HEIDMAN.